United States Patent Office 3,773,942
Patented Nov. 20, 1973

3,773,942
CARBAMOYLOXIMINO ALKENYL-DITHIOLONES USED AS INSECTICIDES
Erwin Nikles, Liestal, Switzerland, assignor to Ciba-Geigy AG, Basel, Switzerland
No Drawing. Original application Feb. 24, 1970, Ser. No. 13,765, now Patent No. 3,678,075. Divided and this application May 11, 1972, Ser. No. 252,501
Claims priority, application Switzerland, Feb. 27, 1969, 2,966/69; Mar. 11, 1969, 3,635/69
Int. Cl. A01n 9/12
U.S. Cl. 424—277      4 Claims

ABSTRACT OF THE DISCLOSURE

A group of 2-carbamoyloximino-4-alkenyl-1,3-dithiolanes is disclosed, which are effective insecticidal compounds particularly for controlling soil insects.

---

This is a division of application Ser. No. 13,765 filed Feb. 24, 1970, now U.S. Pat. No. 3,678,075.

The present invention releates to 1,3-dithiolanyloximinocarbamates of the general Formula I as well as a process for their manufacture and use as active ingredients in pesticidal preparations.

The present invention provides 1,3-dithiolanyloximinocarbamates of the general formula

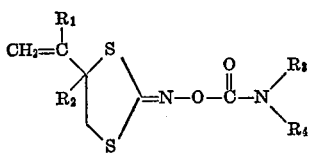

(I)

in which $R_1$ and $R_2$ each represents a hydrogen atom or a lower alkyl group, $R_3$ represents a hydrogen atom or a methyl group and $R_4$ represents a lower alkyl group. The term "lower alkyl group" as used here and hereinafter is a $CH_3$, $C_2H_5$, n-$C_3H_7$, iso-$C_3H_7$, n-$C_4H_9$, secondary $C_4H_9$, iso-$C_4H_9$, tertiary $C_4H_9$, n-$C_5H_{11}$, iso-$C_5H_{11}$, or secondary $C_5H_{11}$ group.

The present invention more particularly provides a compound of the general formula

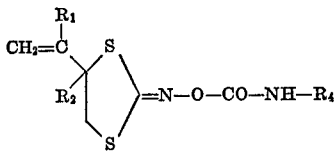

(II)

in which $R_1$ and $R_2$ each represents a hydrogen atom or a lower alkyl group and $R_4$ represents a lower alkyl group.

The present invention especially provides the compound of the formula

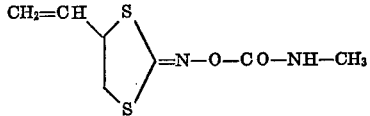

The possible syn($\alpha$) or anti($\beta$) isomers of the oximecarbamates are included in the scope of this invention; accordingly, no special reference is made to them hereinafter.

The present invention also provides a process for preparing the 1,3-dithiolanyl-oximinocarbamates of the formula I, which comprises reacting a trans- or cis-1,4-dihalogeno-2-butene of the general formula

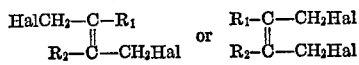

in which "Hal" represents a halogen atom, with a salt of a dithiocarbamic acid of the general formula

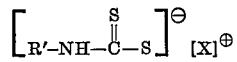

in which R' represents a hydrogen atom or any aliphatic or aromatic radical bound by way of a carbon atom and X represents a cation, to form a cyclic compound of the general formula

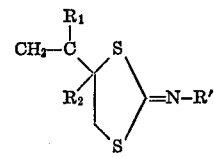

(III)

further reacting the resulting intermediate product with hydroxylamine to obtain the oximino derivative of the formula

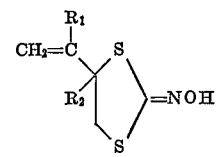

(IV)

and reacting the latter with an isocyanate $R_3$-NCO or $R_4$-NCO or with an alkyl- or methylalkyl-carbamic acid halide of the formula Hal—CO—N($R_3$)($R_4$), in which Hal represents a halogen atom, especially a chlorine atom. $R_1$ to $R_4$ have the meanings defined above.

Preferably R' represents a lower alkyl group. The term "Hal" refers especially to a chlorine or a bromine atom, preferably a chlorine atom. The cation X may be an alkali metal or an unsubstituted or substituted ammonium group.

The reaction temperatures may be varied within a very wide range. The preferred range is from 20 to 100° C. The reaction may be carried out in the presence of a diluent.

The process of the invention is advantageous in that the starting material is easily obtainable and high yields are obtained in a clear, straightforward reaction.

Since the compounds can also be cyclized in a manner known per se using a 1,2-dihalogeno-3-butene as starting material, a high degree of technical efficiency is possible in that, for example, technical dichlorobutene mixtures obtained by the chlorination of butadiene can be used directly for the cyclization process and the desired compound III is obtained as the sole intermediate product.

The compounds of the Formula I have a surprising range of biological activity, as is observed either in the far-reaching control of pests or when used in form of herbicides in areas of cultivated plants where they have a favourable effect on the useful plants.

The present invention also provides a pesticidal preparation comprising, as active ingredient, a compound of the general Formula I, together with a carrier and/or further active ingredient.

As carriers there may be used, for example, solvents, diluents, dispersants, emulsifier, wetting agents, adhesives, binders or thickening agents.

The compounds of the Formula I also act as molluscicides, especially against gastropodes which are schistosome carriers. Furthermore, when applied in very small amounts the new compounds display a good microbicidal activity against bacteria and fungi, especially against phytopathogenic fungi, for example, *Erysiphe cichoracearum*, *Alternaria tenuis* and *solani*. In the concentrations required for this use no damage to the plants can be detected.

Furthermore, the compounds of the Formula I act against nematodes, for example, *Panagrellus redivivus, Meloidogyne* sp. and others, and have also a very good insecticidal and acaricidal activity which is distinguished biologically in a distinct manner by chemosterilising properties.

Thus, for example, these carbamates act strongly against houseflies, aphids, caterpillars and beetles, for example, cornweevil and Colorado beetle. Their contact effect surpasses substantially that of the known active substance "Carbaryl" (N-methyl-α-naphthyl-carbamate).

Their activity against *Phyllodromia germanica, Periplaneta americana, Blatta orientalis, Acheta domestica* and *Rhodnius prolixus* is especially strong.

The new carbamates are, therefore, very suitable for controlling pests in the hygene sector and in protecting stored products.

Their activity against Diptera, Coleoptera, Rhynchoti and Lepidoptera makes them an especially suitable type of compound. Soil insects can be controlled in the soil with very small amounts.

It should be specially mentioned that known rice pests, for example, *Nephotettix cincticeps, Nilaparvata lugens, Sogatella fureifera* or the rice stem borer *Chilo suppressalis*, and cotton pests, for example, Prodenia or Anthonomus, can all be effectively controlled.

The toxicity of the compounds of the Formula I towards warm-blooded being is 10 to 20 times lower than that of 1,3-dithiolanyl-oximino-N-methylcarbamate. They undergo decomposition in the soil and no residues remain in the cultivated soil for a long time.

The oximinocarbamates of the Formula I may be used per se or in combination with suitable additives. The formulation to pesticidal preparations has been described in U.S. Pat. No. 3,329,702, British Pat. No. 1,047,644 and Swiss Pat. No. 424,359. They can be applied in form of solutions, emulsions, concentrates, dusting agents, wettable powders or by spraying and in many cases in form of granulates which ensures in an advantageous manner that the active substance is released over a prolonged period of time. Such granulates can be prepared by dissolving the active substance in an organic solvent, absorbing this solution by a granulated mineral material, for example, attapulgite or $SiO_2$ and removing the solvent. Alternatively, they are also obtained when the active substances of the Formula I are absorbed in the same manner by granulates based on urea-formaldehyde or polyacryonitrile.

Depending on the purpose to be served, such preparations may also be applied by distribution (for example, spraying and dusting) over large surfaces with the aid of aircraft.

The various forms of application of such preparations may be suitably adapted to the individual purpose by incorporating with them substances that improve the distribution, the adhesion, the stability towards rain and possibly the penetration, for example, fatty acids, resins, wetting agents, glue, casein or alginates.

The compounds of the Formula I may be present in the pesticidal preparations of this invention as the only active ingredient or in conjunction with usual insecticides, acaricides, nematocides, bactericides, fungicides, herbicides or fertilizers.

As insecticides there are suitable all the organophosphorus compounds used in pest control, carbamic acid derivatives, chlorinated, hydrocarbons, nitrophenyl derivatives, and also natural active substances, for example, Sabadilla, Rotenones, pyrethrin and others, may be used as mixing partners.

For controlling representatives of the order Acarina the following known acaricides may be preferentially used in combination with the active substances of the Formula I: Dinocap, Binapacryl, 2-secondary butyl-4,6-dinitrophenyl-cyclopropionate, Dinobutone, chlorobenside, fluorobenside, Fenson, Ovex, tetradofon, tetrasul, 4-chlorophenyl-2,4-trichlorophenyl-azosulphide, 2,4 - dichlorophenyl-benzenesulphonate, N'-(4 - chloro-2-methylphenyl)-N,N-dimethylformamidine, Formetanate, 2-butinyl-para-chlorocarbanilate, cyclopropanecarboxylic acid-2-nitro-4-chloranilide or Dicofol.

The concentration in which the preparations are applied may vary within wide limits depending on the kind of application. In general, it ranges from 0.01 to 20% by weight for dilute preparations whereas concentrated ones contain 20 to 98% by weight of active substance. Preparations of maximum concentration are used, intra alia, in the so-called ULV (ultra low volume) technique with a minimum content of additives. The ULV technique is carried out with sprayers giving an extremely fine spray, preferably with the aid of aircraft.

By the admixture of synergists the activity of the carbamates of this invention can be further strengthened. For this purpose there may be used, for example, Sesamin, Sesamex, Piperonylcyclonenes, piperonyl-butoxide, piperonal bis[2-(2 - butoxyethoxy)ethyl]acetate, sulphoxides, propylisomes, N-(2 - ethylhexyl)-5-norbornene-2,3-dicarboxamide, octachlorodipropyl ether, 2 - nitrophenyl-propargyl ether, 4-chloro-2-nitrophenyl-propargyl ether and 2,4,5-trichlor-phenyl-propargyl ether.

In the following Examples which illustrate the invention parts are by weight, unless otherwise indicated.

EXAMPLE 1

2-isopropylimino-4-vinyl-1,3-dithiolan: 194 parts of isopropyl ammonium isopropyl dithio-carbamate are stirred at 30 to 35° C. into a mixture of 165 parts of potassium carbonate, 125 parts of cis-1,4-dichloro-2-butene and 1500 parts by volume of anhydrous alcohol. The suspension is then refluxed for 14 hours, cooled to room temperature and filtered. The filtrate is evaporated, the residue taken up in 100 parts by volume of benzene +cyclohexane 1:1, again filtered and evaporated. The residue is distilled under a high vacuum. The product boils at 106 to 112° C. under 0.025 mm. Hg. pressure.

2-oximino-4-vinyl-1,3-dithiolan: A solution of 16 parts of hydroxylamine hydrochloride in 30 parts of water is added to a mixture of 38.5 parts of 2-isopropylimino-4-vinyl-1,3-dithiolan and 100 parts by volume of alcohol. The whole is refluxed for 5 hours, then poured over 2000 parts of ice water and taken up with ether. The ethereal solution is extracted with N-sodium hydroxide solution. The alkaline extract is rendered neutral with concentrated hydrochloric acid while cooled with ice and extracted with chloroform. The chloroform solution is dried over anhydrous sodium sulphate, filtered and evaporated. The product remains behind in form of an oil.

2-methylcarbamoyl oximino-4-vinyl-1,3-dithiolan: 8 parts of methylisocyanate are dropped at 30 to 40° C. into a solution of 20 parts of 2-oximino-4-vinyl-1,3-dithiolan and 0.1 part of triethylenediamine in 100 parts by volume of dry toluene. The solution is maintained at 40° C. for 14 hours and then evaporated. The residue is crystallised from aqueous methanol and then from toluene+hexane. The product melts at 114 to 117° C. (compound No. 1). When the combined mother liquors are evaporated, a semi-solid product (compound No. 1a) is obtained which corresponds to the stereoisomer of compound 1.

The following compounds are manufactured in this or a similar manner:

No. 2:

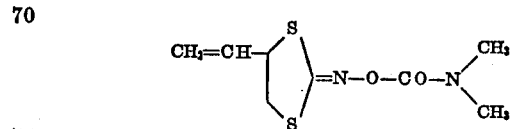

No. 3:

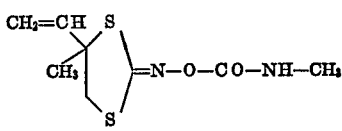

No. 4:

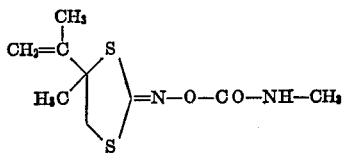

Examples of formulations

Dusting agent: Equal parts of an active substance according to this invention and of precipitated silicic acid were finely ground. When this mixture was mixed with kaolin or talcum, dusting agents having preferably a content from 1 to 6% of active ingredient were obtained.

Spray powder: To obtain a spray powder the following ingredients, for example, were mixed and finely ground together:

50 parts of active substance of this invention
20 parts of "HISIL" (highly adsorptive silicic acid)
25 parts of bolus alba (kaolin)
1.5 parts of sodium 1-benzyl-2-stearyl-benzimidazole-6,3'-disulphonate
3.5 parts of reaction product of para-tertiary octylphenol and ethylene oxide.

Emulsion concentrate

Readily soluble active substances may also be formulated as emulsion concentrates with the following ingredients:

20 parts of active substance
70 parts of xylene
10 parts of a mixture of a reaction product of an alkylphenol with ethylene oxide and calcium dodecylbenzenesulphonate are mixed together. On dilution with water to the desired concentration a spray emulsion is obtained.

Granulate 7.5 g. of an active substance of the Formula I are dissolved in 100 cc. of acetone and the resulting solution is poured over 92 g. of granulated attapulgite (mesh width: 24–28 meshes per inch). The whole is thoroughly mixed and the solvent expelled in a rotary evaporator. The resulting granulate contains 7.5% of active ingredient.

EXAMPLE 2

A dusting agent prepared as described in Example 1, containing 5% of active substance No. 1 and the isomer 1a obtained from the mother liquor of compound 1, produced the following results in the control of pests effecting stored products:

| Pest tested | Minimum concentration for a 100% lethal effect within 24 hours' exposure (mg. of active substance per sq. m.) | |
|---|---|---|
| | Compound No. 1 | Compound No. 1a |
| German cockroach (Phyllodromia germanica) | 12 | 12 |
| American cockroach (Periplaneta americana) | 12 | 12 |
| Russian cockroach (Blatta orientalis) | 25 | 50 |
| Yellow mealworm beetle (Tenebrio molitor): | | |
| Imago | >200 | 50 |
| Larva | >200 | 100 |
| Larder beetle (Dermestes frischii): | | |
| Imago | 25 | 100 |
| Larva | 25 | 100 |
| Sitophilus granarius | 6 | 6 |
| Fur beetle (Attagenus piceus): Larva | >200 | 50 |
| House cricket (Acheta domestica) | 25 | 25 |

EXAMPLE 3

Effect against spider mites

Bush bean plants (Phaseolus vulgaris) in the 2-leaf stage were infected with spider mites 12 hours prior to the treatment with the active substance by covering them with infected pieces of leaves from a culture so that after this time had lapsed a mite population was present on all stages of development of the plants. The plants were then sprayed with the emulsified active substance with the aid of a chromatographic atomiser until an even coat of droplets had formed on the surface of the leaves. The results were evalauted 7 days later. The plant portions were inspected under a stereo-microscope and the lethal results were calculated.

The following table shows the lethal values obtained with Compound 1 an disomer 1a against the species Tetranychus urticae Koch of normal sensitivity.

| | Concentration (p.p.m.) | Killing effect in percent after 7 days on | | |
|---|---|---|---|---|
| | | Ova | Larvae | Adult |
| Compound number: | | | | |
| 1 | 800 | 0 | 100 | 100 |
| | 400 | 0 | 100 | 80 |
| 1a | 800 | 80 | 100 | 100 |
| | 400 | 80 | 100 | 100 |

EXAMPLE 4

Contact effect against Musca domestica (L.) and Ceratitis capitata

One bottom half each of Petri dishes was treated with 1 ml of an acetonic solution of one of the substances Nos. 1 and 1a, which contain 1000, 100, 10, 5 and 2.5 p.p.m. of the active substance. The solvent was then evaporated and under-cooled houseflies were introduced into the prepared Petri dishes and the lids were put on. Each dish contained 10 test flies. After increasing intervals of time the lethal effect for various concentrations was checked. After 4 hours the following killing effects in per cent were recorded:

| | Concentration (p.p.m.) | M. domestica, percent | C. capitata, percent |
|---|---|---|---|
| Compound number: | | | |
| 1 | 1,000 | 100 | 100 |
| | 100 | 100 | 100 |
| | 10 | 100 | 100 |
| | 5 | 50 | 50 |
| | 2.5 | 0 | 50 |
| 1a | 1,000 | 100 | 100 |
| | 100 | 100 | 100 |
| | 10 | 100 | 100 |
| | 5 | 50 | 100 |
| | 2.5 | 50 | 100 |

EXAMPLE 5

Effect against Prodenia litura larvae

A leaf of Malva silvestris was immersed in an aqueous soltuion of the active substance No. 1 or No. 1a, then placed in a covered Petri dish and 5 larvae of Malva silvestris in the L₂-stage each were placed on the leaf, while keeping the atmospheric moisture constant with a moistened plug of cottonwool. The result of this contact and stomach-poison test was checked after 1 and 2 days, after having performed a new infestation atfer one day in each test.

The results achieved were as follows:

| Compound number: | Concentration (p.p.m.) | Killing effect after— 1 day, percent | 2 days, percent |
|---|---|---|---|
| 1 | 800 | 100 | 80 |
|  | 400 | 100 | 80 |
| 1a | 800 | 100 | 100 |
|  | 400 | 100 | 100 |

EXAMPLE 6

(A) Effect against *Rhipicephalus bursa*

5 adult, hungry ticks were counted into a small glass tube and immersed for 1 to 2 minutes in 2 ml. of an aqueous emulsion containing 100 p.p.m. of the substance under test. The tube was then closed with a standardised plug of cottonwool and turned over to enable the cottonwool to absorb the emulsion of active substance. Evaluation was carried out after 1 week and 2 weeks.

For each test two repeats were made. Compound No. 1 showed after 2 weeks a 100% lethal effect, as did Compound No. 1a.

(B) *Boophilus microplus* (larvae)

In the method described under (A) about 10 to 20 larvae were introduced into a small tube and treated with 50 p.p.m. of the substance under test in an aqueous emulsion.

Both Compounds Nos. 1 and 1a achieved a 100% lethal effect after 2 weeks.

EXAMPLE 7

Effect against Diptera

*Lucilia sericata* (larvae): A dilution series each was prepared with the emulsifiable Compounds Nos. 1 and 1a. 2 ml. of a concentration were mixed with 2 g. of chopped horse flesh in a 10 ml. glass vessel, and 20 to 30 freshly hatched larvae were then introduced into each vessel. Evaluation was carried out 24 hours later. A concentration of 24 p.p.m. and 12 p.p.m. respectively produced a 100% lethal effect after 24 hours.

EXAMPLE 8

Effect against soil insects 10 larvae of *Diabrotica balteata* (banded cucumber beetle), 4 to 7 days old, on one end of a strip of filter paper, 15 cm. wide and 90 cm. long, which had been impregnated with a solution of the active substance, were placed in a Petri dish. The other end of the strip carried 10 germinated grains of maize as a feed source. The dishes were covered and kept for 48 hours at room temperature, during which time the larvae attempted to travel over the whole length of the strip of filtered paper.

This test was repeated once.

The lethal effect, achieved with an 0.005% solution of Compound No. 1 and Compound No. 1a respectively was 100%.

I claim:

1. A method for combatting insects which comprises contacting said insects with an insecticidally effective amount of a compound of the formula:

$$CH_2=C(R_1)(R_2)\underset{S}{\overset{S}{\diagup\!\!\!\diagdown}}=N-O-\underset{\parallel}{\overset{O}{C}}-N(R_3)(R_4)$$

in which each of $R_1$ and $R_2$ represents hydrogen or lower alkyl, $R_3$ represents hydrogen or methyl, and $R_4$ represents lower alkyl.

2. A method according to claim 1 in which, in the compound, $R_3$ represents hydrogen.

3. The method according to claim 2 in which the compound is $$CH_2=CH-\underset{S}{\overset{S}{\diagup\!\!\!\diagdown}}=N-O-CO-NH-CH_3$$

4. An insecticidal composition comprising an insecticidally effective amount of a compound of the formula:

$$CH_2=C(R_1)(R_2)\underset{S}{\overset{S}{\diagup\!\!\!\diagdown}}=N-O-\underset{\parallel}{\overset{O}{C}}-N(R_3)(R_4)$$

in which each of $R_1$ and $R_2$ represents hydrogen or lower alkyl, $R_3$ represents hydrogen or methyl, and $R_4$ represents lower alkyl, and a suitable carrier.

References Cited

UNITED STATES PATENTS 3,193,561  7/1965  Addor _____ 260—327

ALBERT T. MEYERS, Primary Examiner

L. SCHENKMAN, Assistant Examiner